United States Patent
Friedman et al.

(10) Patent No.: US 7,564,039 B1
(45) Date of Patent: *Jul. 21, 2009

(54) DUAL SUBSTRATE PLASMA PANEL BASED IONIZING RADIATION DETECTOR

(75) Inventors: Peter S. Friedman, Toledo, OH (US); Ray A. Stoller, Paulding, OH (US)

(73) Assignee: Integrated Sensors, LLC, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/153,535

(22) Filed: Jun. 16, 2005

Related U.S. Application Data

(60) Provisional application No. 60/580,651, filed on Jun. 17, 2004.

(51) Int. Cl.
*G01T 1/18* (2006.01)
(52) U.S. Cl. ...................................... 250/374
(58) Field of Classification Search ................... 250/374
See application file for complete search history.

(56) References Cited

U.S. PATENT DOCUMENTS

| | | | | |
|---|---|---|---|---|
| 3,772,521 | A | 11/1973 | Perez-Mendez | 250/385.1 |
| 4,816,683 | A | 3/1989 | Marsden | 250/385.1 |
| 4,999,501 | A | 3/1991 | Lacy | 250/385.1 |
| 5,773,829 | A | 6/1998 | Iwanczyk et al. | 250/367 |
| 6,011,265 | A * | 1/2000 | Sauli | 250/374 |
| 6,097,032 | A * | 8/2000 | Tanimori et al. | 250/374 |
| 6,703,619 | B2 | 3/2004 | Takahashi | 250/385.1 |
| 7,170,066 | B2 | 1/2007 | Virtanen | 250/374 |
| 2003/0040877 | A1* | 2/2003 | Warburton et al. | 702/78 |
| 2006/0049362 | A1* | 3/2006 | Friedman et al. | 250/374 |

FOREIGN PATENT DOCUMENTS

EP 1274115 A2 * 1/2003

OTHER PUBLICATIONS

Contract No. DTRA01-03-C-0042, issued by the U.S. Dept. of Defense, Defense Threat Reduction Agency to Photonics Systems, Inc. on May 16, 2003 and completed Oct. 31, 2004.
G. P. Lasché et al., "Detection Sensitivity for Special Nuclear Materials with an Advanced High-Pressure Xenon Detector and Robust Fitting Analysis", IEEE Trans. Nulc. Sci., 48 (2001) 325-329.
F. Sauli, "GEM: A New Concept for Electron Amplification in Gas Detectors", Nucl. Instr. and Meth. A 386 (1997) 531-534.

(Continued)

*Primary Examiner*—David P Porta
*Assistant Examiner*—Shun Lee
(74) *Attorney, Agent, or Firm*—Squire, Sanders & Dempsey, LLP

(57) ABSTRACT

A plasma panel based ionizing-photon radiation detector includes an input and output substrate with gamma-ray to free-electron conversion occurring primarily on the input plate and a sealed discharge gas between the substrates. X-electrodes and Y-electrodes are formed on the two substrates and configured to form a plurality of pixels. Impedances are coupled to the X and Y electrodes and a power supply is coupled to the X-electrodes. Discharge event detectors coupled to impedances detect discharge events on the Y electrodes and at the pixel locations, which leads to the detection of ionizing-photon radiation.

20 Claims, 3 Drawing Sheets

OTHER PUBLICATIONS

B. Ketzer et al., "Triple GEM Tracking Detectors for COMPASS", IEEE Trans. Nucl. Sci., 49 (2002) 2403-2410.

O. Bouhali et al., "The MICROMEGEM Detector", Nucl. Instr. and Meth. A 459 (2001) 211-220.

Glenn F. Knoll, "Radiation Detection and Measurement", $3^{rd}$ ed. (John Wiley & Sons, Inc., 2000), pp. 192-194 and 509 (*book cover included*).

J. F. Clergeau et al., "Operation of Sealed Microstrip Gas Chambers at the ILL", IEEE Trans. Nucl. Sci., 48 (2001) 1075-1080.

J. E. Bateman et al., "Studies of the Gain Properties of Microstrip Gas Counters Relevant to Their Application as X-Ray and Electron Detectors", IEEE Trans. Nucl. Sci., 49 (2002) 1644-1650.

K. P. Ziock and L. F. Nakae, "A Large-Area PSPMT-Based Gamma-Ray Imager with Edge Reclamation", IEEE Trans. Nucl. Sci., 49 (2002) 1552-1559.

Thorsten Graeve and Gene Weckler, "High-Resolution CMOS Imaging Detector," Medical Imaging 2001—Physics of Medical Imaging, SPIE vol. 4320.

G. J. Mahler et al., "A Portable Gamma-Ray Spectrometer Using Compressed Xenon", IEEE Trans. Nucl. Sci. NS-45 (1998) 1029-1033.

Paul E. Fehlau, "Integrated Neutron/Gamma-Ray Portal Monitors For Nuclear Safeguards", IEEE Trans. Nucl. Sci. NS-41 (1994) 922-926.

V. V. Nagarkar et al., "Structured LiI Scintillator for Thermal Neutron Imaging", IEEE Trans. Nucl. Sci. NS-48 (2001) 2330-2334.

J. D. Kurfess and B. F. Phlips, "Coincident Compton Nuclear Medical Imager", IEEE Nucl. Sci. Symposium (San Diego, 2001) http://heseweb.nrl.navy.mil/gamma/detector/papers/M4-5.pdf.

A. Breskin, "Advances in gas avalanche radiation detectors for biomedical applications", Nucl. Instr. and Meth. A 454 (2000) 26-39.

F. Angelini et al., "The micro-gap chamber", Nucl. Instr. and Meth. A 335 (1993) 69-77.

T. Beckers et al., "Optimization of microstrip gas chamber design and operating conditions", Nucl. Instr. and Meth. A 346 (1994) 95-101.

D. F. Anderson, S. Kwan and M. Salomon, "A low-pressure, microstrip gas chamber operated with secondary-electron emission", Nucl. Instr. and Meth. A 346 (1994)102106.

International Search Report, PCT/US06/12775 mailed Nov. 19, 2007.

* cited by examiner

DUAL SUBSTRATE PLASMA PANEL BASED IONIZING RADIATION DETECTOR

RELATED APPLICATIONS

This application claims the benefit of U.S. Provisional Application No. 60/580,651, filed Jun. 17, 2004, the specification of which is herein incorporated by reference.

FIELD OF THE INVENTION

One embodiment of the present invention is directed to an ionizing-photon radiation detector. More particularly, one embodiment of the present invention is directed to a plasma panel based ionizing-photon radiation detector.

BACKGROUND INFORMATION

Many useful applications, such as the detection of radioactive material and computer-assisted tomography ("CAT") rely on the detection of photon radiation, known as X-ray and/or gamma-ray radiation. Both of these types of high-energy photon radiation cause ionization and for purposes of this disclosure the two terms, X-ray and gamma-ray, are used interchangeably. In terms of the detection of such ionizing radiation, the spectral region of greatest interest for most applications generally falls between the energies of about 20 to 2,000 keV (i.e., 0.02 to 2 MeV).

In the above spectral range of interest, the primary types of interaction are the photoelectric and Compton effects. The relative contribution from each can be determined in quantitative fashion a priori via the combination of the incident photon energy and the atomic number (i.e., Z-number) of the interacting atom. The photoelectric effect describes a single atomic absorption, whereas the Compton effect describes an inelastic scattering collision that simultaneously results in a Compton recoil electron and a Compton scattered photon. The latter can be inelastically scattered again and again, until the photon either exits or is "absorbed" by the interacting media. Of the two processes, the primary basis for the majority of known ionizing radiation detectors used in imaging applications at photon energies up to at least 200 keV is the photoelectric effect, which causes the initial production of a single "free-electron" and a corresponding positive atomic ion.

In order to detect ionizing electromagnetic radiation, several known sensing devices are commonly used. One of the earliest known electronic devices is the ionization chamber. Detection of radiation in an ionization chamber, such as a Geiger-Müeller ("GM") tube, is based upon electrical conductivity induced in an inert gas (usually containing argon and neon) as a consequence of ion-pair formation.

Further, a number of solid state semiconductors are used for detecting ionizing-photon radiation, the most common of which is the silicon photodiode, which can be either crystalline or amorphous in structure. However, a number of other semiconductor materials have also been used, including Ge, GaAs, CdTe, CdZnTe, etc. The basic principle of operation for semiconductor detectors is similar to the ionization chamber, namely that electromagnetic radiation absorbed by the semiconductor simultaneously creates both electrons and positive holes. The resulting charges move in opposite directions in an applied field, with the current being proportional to the energy of the incident ionizing radiation. The use of large area, amorphous-silicon detectors has recently been employed to produce digital electronic images which can replace X-ray film.

Currently, the most effective known radiation detector is generally considered to be a scintillation counter. Compared to a GM-tube that can have a "dead-time" on the order of 100 µs (microseconds) between counting events, during which time any response to radiation is impossible, a scintillation detector generally has a dead-time of about 1 µs or less. Another advantage of the scintillation detector is that the number of emitted photons produced by the scintillation plate or crystal, upon interaction with ionizing radiation, is approximately proportional to the energy of the incident radiation. However, a conventional scintillation counter requires an expensive crystalline scintillation plate of high optical quality along with expensive photodiodes or photomultiplier tubes.

Based on the foregoing, there is a need for an ionizing-photon radiation detector with high resolution capability, fast pixel response, minimal dead-time, and which can be manufactured in large sizes relatively inexpensively.

SUMMARY OF THE INVENTION

One embodiment of the present invention is a plasma panel based ionizing-photon radiation detector that includes an input and output substrate with sealed gas between the substrates. The input substrate contains an X-electrode layer or pattern that is on the inner wall interfacing the gas with a voltage potential applied with respect to opposing electrode structures on the output substrate. The Yc-electrodes (i.e., column) and Yr-electrodes (i.e., row) on the output substrate are configured to form a plurality of pixels to establish location and current flow direction from ionized gas discharges between the input and output substrates. Impedances are coupled to the Yc- and Yr-electrodes and a power supply circuit is coupled to the input substrate X-electrode layer, and the Y current-directional electrodes. Discharge event detectors coupled to impedances detect discharge events on the Yc- and Yr-electrodes and at the pixel locations, which leads to the detection of ionizing-photon radiation.

DETAILED DESCRIPTION

Figure 1:
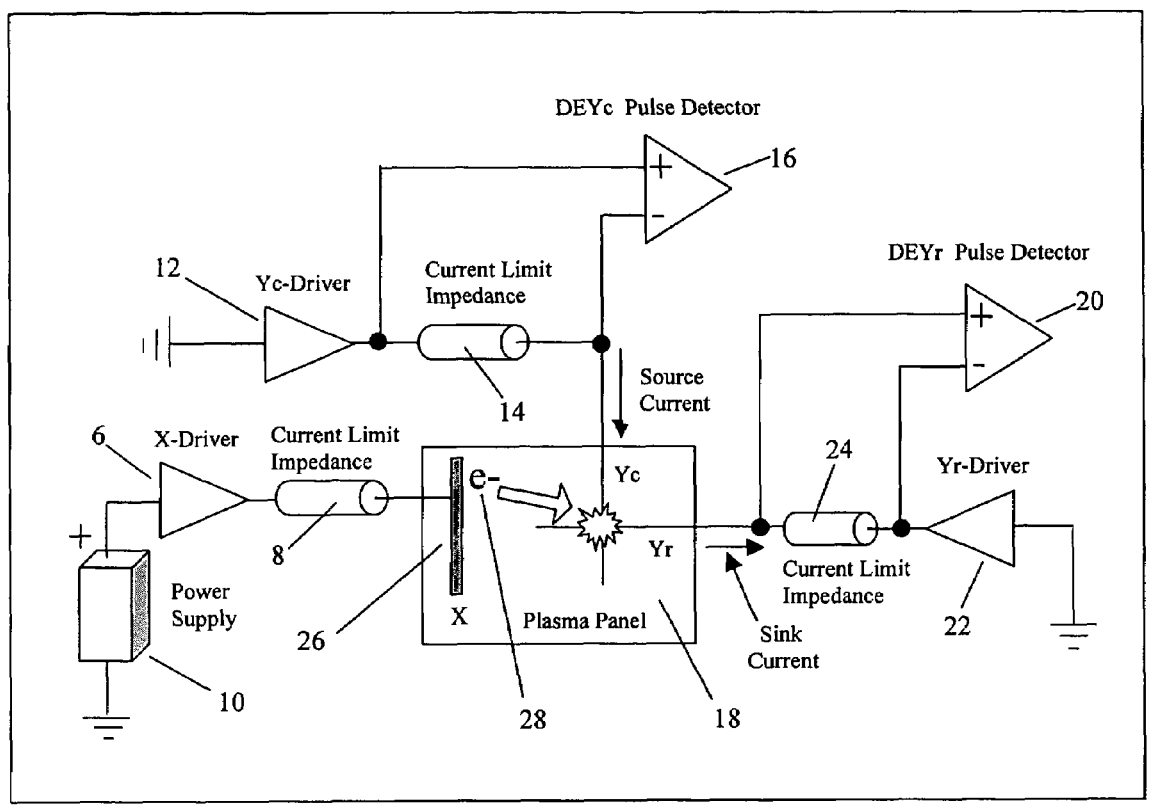
FIG. 1 is a block diagram illustrating a simplified circuitry attached to two current-directional electrodes (Yc and Yr) defining a pixel centroid of a plasma panel based detector in accordance with one embodiment of the present invention for electrically sensing a discharge site. For simplification, "X" signifies the input substrate's emitter source electrode voltage potential at a pixel, and "X-Driver" signifies the circuit means for supplying "X". Similarly, "Y" signifies the electrode circuitry on the output substrate.

One embodiment of the present invention is the use of a gas discharge panel (referred to as a plasma display panel ("PDP") if originally designed for display applications, or plasma panel ("PP") if designed for photon radiation detection) coupled to electronic circuitry to detect ionizing-photon radiation. Similar to a GM-tube, a PP can be considered a gas-ionization chamber that generates a current pulse (or plasma) induced in a gas as a consequence of ion-pair formation triggered by electrons injected into the gas, and followed by a rapid acceleration of secondary ion multiplication. In both cases (i.e., GM-tube and PP), the initial electron injection/acceleration event can be an impinging gamma-ray interacting with the device material in the presence of an appropriate electric field. The GM-tube detector is a highly cost effective and sensitive detector, but without imaging capability.

A typical GM-tube and PDP operates at a high potential between the anode and cathode, generally 200-400V in the case of a commercial PDP, and 500-1500V in the case of a GM-tube. However, the field gradients, which are more important than the actual voltage settings, may not be as far apart because the gap between the anode and cathode in a PDP is on the order of 0.1 mm, which is about two orders-of-magnitude smaller than in the GM-tube. As indicated above, both devices generate secondary ion-pair production by collisions between accelerated electrons and gaseous atoms. As a consequence, both devices cause amplification of the initial ion current, and the electrical pulse quickly becomes very large, resulting in an electron avalanche event. More importantly, however, is the fact that all of the electrode elements along at least one axis of a PP-based detector in accordance with one embodiment of the present invention can electrically act as parallel sensors (analogous to multiple GM-tubes), so that if one electrode is experiencing "dead-time", the other electrodes can still remain unaffected and be ready to fire.

In a standard TV-resolution PDP (i.e., not high resolution or "HDTV"), there are 480 scan lines and about 852×3 column electrodes, corresponding to 1,226,880 pixels which in principle can act as independent "parallel GM-tubes". Therefore, for a relatively inexpensive PP-detector in accordance with an embodiment of the present invention, due to a combination of the very large number of parallel sensing elements and much faster response time, the collection efficacy compared to a similarly sized array of GM-tubes, is at least two orders-of-magnitude better. However, an area array of GM-tubes would be expected to be considerably more expensive and cannot provide the additional features of embodiments of the present invention, such as high-resolution imaging capability and radioisotope identification.

In a PDP, the avalanche event is a very fast plasma discharge and is self-limiting by virtue of the build up of an opposing voltage or impedance that cuts off the discharge before too high of a current develops. In the case of AC-PDPs, this opposing voltage is induced across a thick-film dielectric (i.e., series capacitor), whereas in DC-PDPs the extinguishing voltage-drop occurs across a series resistor. Without an opposing voltage, the plasma discharge will not self-extinguish and an arc will occur that can vaporize the PDP electrodes.

In contrast, in a GM-tube, the current is self-limiting by the build up of a space charge "dark" region from the slower moving cations that effectively terminates the flow of electrons to the anode. The net effect in the case of a GM-tube is a momentary pulse of current followed by an interval during which the tube does not conduct. During this "dead-time" when the tube is non-conducting, response to radiation is impossible. The dead-time, during which the space charge must dissipate, represents an upper limit in the response capability of the GM-tube and is on the order of 50-150 μs. Unlike the GM-tube, in the PP-based detector in accordance with an embodiment of the present invention, the dead-time can be on the order of 1 μs, and so it can respond about 100 times faster—i.e., on a similar time scale as some of the photomultiplier tubes that might be used in a scintillation counter.

The gases used in a GM-tube and a PDP are similar—typically argon-neon in GM-tubes and neon-xenon (which might include argon and/or helium) in commercial PDPs. However, a plasma panel designed as a PP-based detector in accordance with an embodiment of the present invention is operated using a higher-voltage gas mixture than a commercial television PDP (e.g., on the order of perhaps 600 volts, depending upon design requirements), and optimized for a gamma-ray initiated avalanche caused by a photon induced free-electron ejected from the panel wall into the gas. The panel wall it is noted, is any layer or solid surface in close proximity to the gas, and can be the panel substrate itself or any solid material layer or film that is coated to, or otherwise attached to, the substrate surface facing the gas. Typically, however, "panel wall" refers to the substrate layer close to and including the emitter source electrode, although the term also includes any internal 3-dimensional vertical structure such as a barrier-rib located on the panel surface. For free-electrons generated by the interaction of ionizing-photon radiation in the detector wall, if the electron range-energy curve is known precisely for one wall material, then it can be reasonably accurately estimated for other wall materials by simple scaling based on the comparative material density ($\rho$) according to the relationship: $\rho_1 R_1 = \rho_2 R_2$. It is noted that generally for a given energy, the electron range (R) does not vary that much from one material to the next, as can be seen in the preceding equation. There can, however, be order-of-magnitude variations in the gamma-ray interaction for various wall materials at different energies.

Significant reaction to low energy gamma radiation in a gas-filled radiation detector can occur in both the gas media and the device container walls. The probability of such interactions between photons with matter is expressed as a collision cross-section for the interacting media (e.g., per atom) and is a function of the incoming photon energy. However, even for detection devices containing fill-gases with high atomic numbers (i.e., high-Z) such as xenon, relatively little photon attenuation will occur at low gamma-ray energies in gaseous radiation detectors operating at reduced pressures with small gas gaps (i.e., gas "thickness" dimension). In the spectral region above ~100 keV, which is the primary spectral range of interest for the detection of nuclear materials, incident gamma-ray attenuation within a PP-sensor is expected to occur almost exclusively in the plasma panel container walls. For medium-Z to high-Z wall material, and for energies up to a few hundred keV, free-electron generation via the photoelectric effect will dominate (i.e., photon absorption); whereas at higher energies, the device wall interaction will involve significant Compton scattering. However, regardless of the mechanism, only those free-electrons that manage to escape from the wall into the gas can be detected. Thus optimization of the PP "wall" structure and materials for a particular incident ionizing-photon energy range in one embodiment of the present invention leads to the outer wall surface being of a low-Z, non-interacting material, with the inner (gas-contacting) wall surface utilizing higher-Z materials and with a thickness appropriate to achieve significant photon interaction, yet not so thick as to be beyond the range of the liberated free-electrons being able to reach the gas.

The spectral region of particular interest with regard to detecting nuclear materials for possible use in weapons of mass destruction (e.g., uranium, plutonium, radium, etc.) primarily encompasses the energy range from about 100 keV to 1.2 MeV. Towards the low end of this range is the radioisotope $^{57}$Co, which emits gamma-rays at 122 keV (close to uranium). Near the midrange is $^{137}$CS, which emits gamma-rays at 662 keV (close to plutonium). Both of these radioisotopes (i.e., Co and Cs) have been successfully detected by a PP-sensor device in accordance with embodiments of the present invention. However, the two edges of the above spectral region of interest represent very different materials and device optimization solutions. For example, below 100 keV the cover-plate/substrate thickness and material attenuation should be minimized so as to maximize incident photon transmission, whereas above 1 MeV sufficient interaction with the sensor active media requires increased material thickness.

In the voltage realm of an operating and optimized PP-device in accordance with embodiments of the present invention, each gamma-ray induced free-electron that escapes from the wall into the gas (or created directly in the gas) should be able to "immediately" undergo electron multiplication in the high E-field environment of the nearest pixel electrode and thus cause a "plasma" gas discharge event ("DE") or avalanche which can be electronically and/or optically sensed, and even visually seen. In a PP-device in accordance with an embodiment of the present invention, this DE self-limits via opposing impedances in series with the pixel discharge electrode (across which electronic pulses can be counted) to confine the discharge to its original pixel site thus preventing "run-away" avalanche delocalization. The DE output pulse from each pixel should essentially always be about the same, regardless of the number of free-electrons initially entering the same local pixel space at the same moment in time. However, any free-electron created by a different incident gamma-ray photon or a Compton scattered photon generated by the original incident gamma-ray entering a different pixel field space, will create a different DE and be counted separately. Thus, the number and distribution of pixel discharges should reflect the incident photon intensity and be able to provide an "image" of the incident gamma-ray source.

GM-tubes on the other hand, have no such imaging capability because the entire device acts as a "single pixel" and therefore cannot count "simultaneous" free-electrons ejected from different spatial regions of the cathode-wall tube surface. Thus with its high pixel spatial resolution, a PP-based detector in accordance with an embodiment of the present invention potentially has an image resolution capability at least as high as a scintillation detector.

FIG. 1 is a block diagram illustrating the circuitry attached to two current-directional electrodes (Yc and Yr) defining a pixel centroid 18 of a PP-based detector in accordance with one embodiment of the present invention for electrically sensing a discharge site. The circuitry attached to the X-axis and emitter source electrode 26 of the plasma panel includes a power supply 10, an X-Driver 6 and a current limit impedance 8. The circuitry attached to the Yc-axis of the plasma panel includes a Yc-Driver 12, a current limit impedance 14 and a DEYc pulse detector 16. The circuitry attached to the Yr-axis of the plasma panel includes a Yr-Driver 22, a current limit impedance 24 and a DEYr pulse detector 20. In either or all axes the current limiting impedances can be implemented as resistances and/or reactances. In one embodiment, the drivers, impedances and pulse detectors of FIG. 1 may be active or passive elements, and may in some combinations be provided by integrated circuits. Further, in one embodiment, Yc-Driver 12 and Yr-Driver 22 are not included on an individual electrode basis as is common in commercial PDP video display applications.

The sensing shown in FIG. 1 is initiated through a gamma-ray interaction generating a free-electron 28 ejected out of the emitter source X-electrode 26 and entering the high E-field defining the pixel space 18 as previously described. The mechanism can also be expressed in chronological terms relative to an avalanche or discharge event ("DE")—i.e., before, during or after the avalanche. It is also useful to be able to quantify the sensing ability of the DE in physical terms. In this regard a "bare" plasma panel reference, known as the "discharge margin" ("DM") voltage, is useful for improving the plasma panel sensitivity. The DM voltage correlates to the detection distance sensitivity of the PP-sensor. Specifically, the larger the DM voltage, the greater the apparent sensitivity (or detection distance) of the PP-device with respect to a given radioactive source. The discharge and/or recovery speed (in microseconds), the manufacturing cost, and the collection efficacy are other factors relevant to optimizing embodiments of the present invention. The factors involved in optimizing embodiments of the present invention are discussed below relative to panel gas mixture, panel design considerations, and panel electronics.

Panel Gas Mixture

Significant improvement in detection sensitivity for a PP-device in accordance with embodiments of the present invention can be achieved by modifying the plasma panel gas mixture. The basic xenon-in-neon mixture used in PDPs designed for video display applications can be easily modified to increase the probability of gaseous interactions with regard to ionizing-photons by increasing the PP-device internal gas pressure. However, more significant improvement can be achieved (in terms of both absorption and inelastic scattering) by increasing the average atomic-weight or Z-number of the gas mixture through: (1) replacement of helium with neon, argon, krypton and/or xenon gas; (2) replacement of neon with argon, krypton and/or xenon gas; and (3) any combination of the above that results in either more xenon and/or a heavier average atomic-weight gas mixture. As a side benefit, increasing the concentration of heavier species such as xenon, increases the reaction cross-sections and hence the probability of electron multiplication and therefore the gas-discharge reaction-rate kinetics, which in turn tends to reduce the plasma panel discharge time and thus shorten device dead-time.

Panel Design Considerations

The PP-configuration used in accordance with embodiments of the present invention can be optimized by developing designs based on materials and geometry that maximize the generation of free-electrons along with avalanche response sensitivity and electrode resolution, while minimizing dielectric-surface-charge at the gas interface, avalanche spread, discharge time and manufacturing cost. To maximize gamma-ray to free-electron conversion, high-Z materials should be employed close to the dielectric-gas interface. Both the actual materials chosen and the thickness for the dielectric and electrodes should be based in large part upon efficient transmission and ejection of free-electrons into the gas. To minimize the dielectric-surface-charge at the gas interface, in one embodiment the panel is a DC-PP structure (as opposed to an AC-PP structure). However, there may be a trade-off between the gas interface dielectric-surface-charge term, and the avalanche and spatial resolution terms. The structure and electrical means for optimizing avalanches should inhibit charge buildup, and/or erase charge.

The avalanche response is affected by the gas properties and the electric field. These in turn are affected by the gas gap (i.e., spacing between the input and output substrates) and gas pressure. For example, increasing the voltage and/or the electric field strength at the gas-surface interface of the input and/or output substrates, enhances the acceleration of free-electrons into the gas. Therefore the panel wall structure and electrodes in accordance with embodiments of the present invention are optimized by taking all these into account, as well as the free-electron and surface-charge effects. To the extent that electronics may be embedded into the structure, this also is taken into account. The electric field is determined by the shape and arrangement of electrodes, and so these should be considered. The goal in at least one embodiment is to achieve avalanches that occur with durations on the order of 1 μs or less, and with current peaks on the order of about 1 milliampere ("mA").

To minimize avalanche spread, in one embodiment the discharge sites are isolated by structural and/or electrical means. The structural means needs to minimize surface charges as discussed above, and the electrical means needs to inhibit and/or erase charges. The electrical means also needs to segregate or block out in space and time each avalanche from others. The panel configuration needs to take all of these means and terms into account, including electrode structure and organization, and integrated electronics features to implement the electrical means discussed. The same rationale for minimizing avalanche spread, also applies to maximizing spatial resolution. Maximized spatial resolution should be considered together with the imaging function to be achieved.

Panel Electronics

Figure 2:
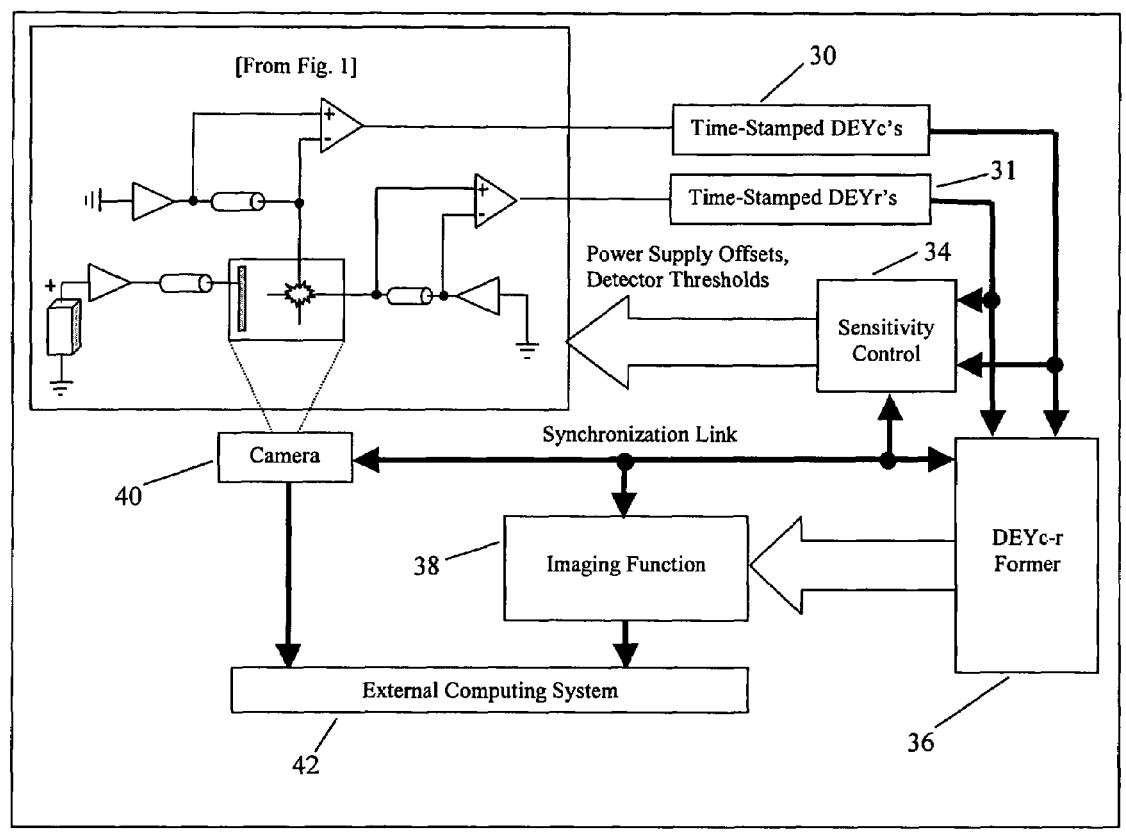
FIG. 2 is a block diagram illustrating detection event processing circuitry that is attached to the circuitry of FIG. 1 in accordance to an embodiment of the present invention.

FIG. 2 is a block diagram illustrating detection event processing circuitry that is attached to the circuitry of FIG. 1 in accordance to an embodiment of the present invention. The detection event processing circuitry, discussed in more detail below, includes time-stamped DEYc's 30 and time-stamped DEYr's 31, sensitivity control 34, DEYc-r former 36, imaging function 38, camera 40, and an external computing system 42.

In one embodiment, the electronic sensing and detecting circuitry shown in FIG. 1 and FIG. 2 are involved before, during, and after an avalanche. Power supply 10 biases the electrical sensing mechanisms before the avalanche. The detection electronics (e.g., DEYc pulse detector 16, and DEYr pulse detector 20) provide the sensing mechanism during an avalanche. The DE processing circuitry (e.g., DEYc's 30, DEYr's 31, sensitivity control 34, DEYc-r former 36, imaging function 38, camera 40, and external computing system 42) provides the after-avalanche sensing mechanism.

Power supply 10 in one embodiment is the power supply to the plasma panel and has one output connected to the X-electrode(s) on one side of a DC plasma panel. In an embodiment having an AC plasma panel, there is at least one "X" output and one "Y" output from power supply 10. In one embodiment power supply 10 can be implemented as multiples of the same circuit with their separate outputs going to individual electrodes or groups of electrodes. In one embodiment, power supply 10 is adjustable, under control of the DE processing system described below.

As discussed, a DE equals a gamma-ray sensing event, therefore the following notation may be used in describing embodiments of the present invention:
DE=discharge event=gamma-ray sensed
DEYc=DE sensed in the Yc-axis (i.e., output column electrode) of the plasma panel
DEYr=DE sensed in the Yr-axis (i.e., output row electrode) of the plasma panel
DEYc-r=DE sensed at a Yc-Yr pixel location of the plasma panel As described, in embodiments of the present invention, a DE is self-limiting by virtue of an opposing impedance that cuts off the discharge before a run-away current develops that could vaporize the electrode(s). The "opposing impedance" in one embodiment is impedance 14 and impedance 24 of FIG. 1, which can be resistive in the case of a DC plasma panel. Whenever a DE occurs, the current flowing through the electrodes and their associated impedances causes a voltage drop across the impedance which terminates the discharge. The momentary voltage drop across the impedances in the current path of the DE is sensed by DEYc and DEYr pulse detectors 16 and 20 shown in FIG. 1.

As shown in FIG. 2, the outputs of DEYc and DEYr pulse detectors 16 and 20 are coupled to synchronizing circuits that time-stamp each event referenced to a master clock. Therefore, DEYc and DEYr events with the same time-stamp are combined to define and store DEYc-r's in a DEYc-r former 36 circuit. DEYc-r former 36 provides information to sensitivity control 34 circuit that provides feedback information to power supply 10 and DEYc and DEYr pulse detectors 16 and 20. Feedback control may be implemented for real-time impedance adjustment and optimization. The DE processing system is a closely linked system requiring coordinated design optimization involving the Yc and Yr impedances, power supply (whether AC or DC), drive waveforms, pulse detectors, and almost every aspect of the plasma panel's configuration and materials selection. The DE circuitry processing system in accordance with embodiments of the present invention also feeds a stream of sequential DEYc-r frames or "pictures" to imaging function 38. Because the master clock should be capable of running at a speed high enough to catch DE's sometimes occurring continuously, simultaneously and back-to-back, large amounts of raw data could be generated such that the data might need to be appropriately filtered and/or compressed using known processing methods. In one embodiment, standard commercial gate arrays, memory chips and other IC components are implemented to meet the DE processing requirements.

In one embodiment, camera 40 is included in the DE processing to perform various functions. First, if one side of the plasma panel has optically clear discharge sites, camera 40 may be used to directly capture DEYc-r's. Camera 40 is synchronized to sensitivity control 34, DEYc-r former 36 and imaging function 38. In another embodiment, a second camera function may be used to capture photodiode (i.e., LED) blinks from current in the electrode paths. In this embodiment, the photodiodes transform discharge current to light pulses that the camera would capture as DEYc and DEYr "pictures", which would further be synchronized and processed in DEYc-r former 36 and imaging function 38.

As shown in FIG. 2, in one embodiment the DE processing system feeds a stream of sequential DEYc-r frames or "pictures" from DEYc-r former 36 to imaging function 38. In one embodiment the DEYc-r frames are translated into a protocol and transport scheme that can be readily connected and processed by external computer system 42 using known processing techniques. A bi-directional bus or network function is represented by the 4-point arrow structure indicated as the "Synchronization Link" in FIG. 2.

Figure 3:
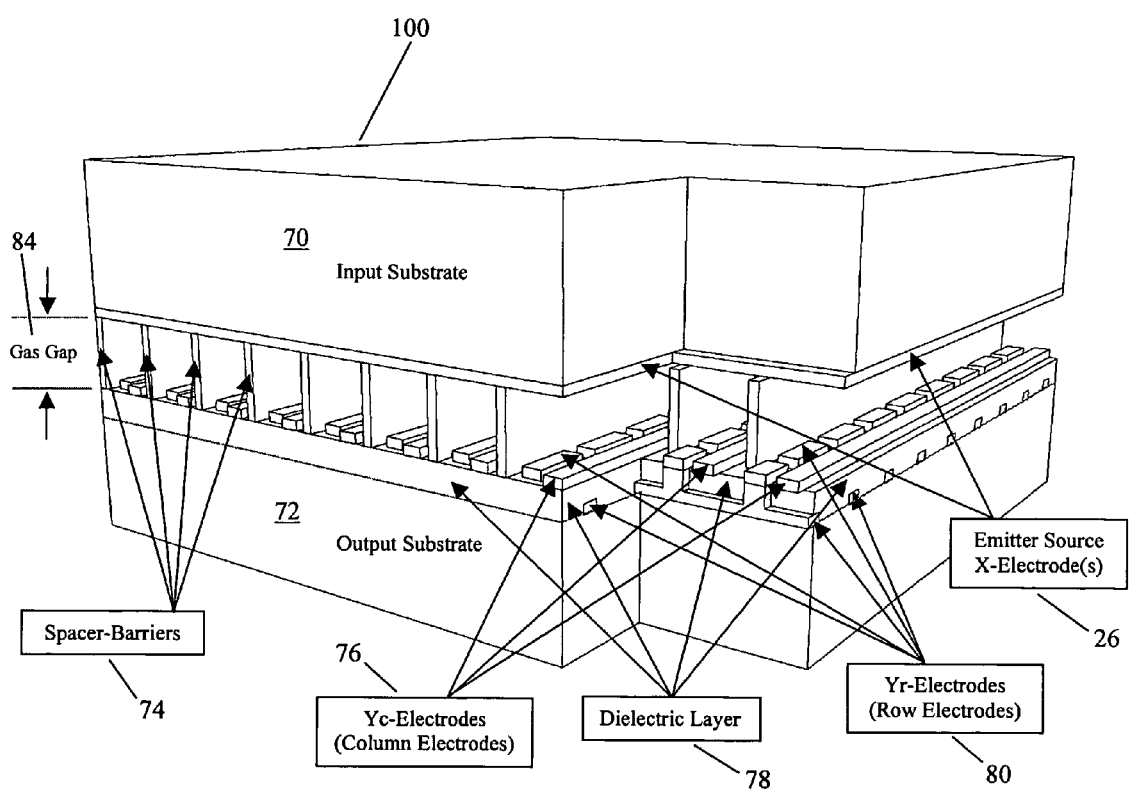
FIG. 3 is a perspective diagram of a plasma panel based detector in accordance with one embodiment of the present invention.

FIG. 3 is a perspective diagram of a PP-based detector 100 in accordance with one embodiment of the present invention. PP-based detector 100 includes an input (front) substrate 70 which is the side of the plasma panel where incident radiation enters. Input substrate 70 includes a gamma-ray to free-electron conversion/emissive layer interfacing the gas. Input substrate 70 may be a glass material, or metal, or a lamination of glass and metal or metal and metal. Advantages of smooth conductive surfaces with uniform voltage characteristics could be realized with metal substrates, as well as with thin-film coatings such as chrome, nickel, tin oxide, ITO, etc. on glass. Input substrate 70 may also be a lamination or an integrated portion with the emissive layer.

PP-based detector 100 includes an emitter source X-electrode 26. In one embodiment, emitter source X-electrode 26 may be a conductive sheet or layer with a voltage potential applied to it with respect to the opposing Y-electrodes on the output substrate. In another embodiment, emitter source electrode 26 can be patterned, and the patterns may be aligned with opposing electrodes on the output substrate 72 (discussed below) to optimize sensing mechanisms and pixel locations. Patterning may be done such that there could be transparency to low energy (i.e., keV) ionizing-photon radiation, passing some of it through to allow direct interactions with the gas.

PP-based detector 100 may optionally include spacer-barriers 74. Spacers 74 may be just a few pixels in length, and if so of almost any cross-sectional shape (e.g., rectangular, cylindrical, etc.), or as long as an entire electrode row or column. Additionally they may be applied sparingly at only a few necessary positions, just enough to maintain structural integrity in an open-cell type structure. In embodiments of PP-based detectors having a small size, spacers within the device active area may be avoided entirely by being placed near the panel periphery and adjacent to, or close to, the perimeter seal. In a more complex "rib" structure embodiment, the spacer-barriers 74 might be located alongside every electrode row or column as shown in FIG. 3, or at regularly spaced intervals, and may be partially conductive. In such a rib structure, the spacer-barriers act as both barriers to discharge-spreading and as spacers. In a more complex "closed-cell" embodiment (not shown), the barriers would essentially fully-enclose each discharge site. However, a closed-cell structure should still have some kind of small barrier "openings", employing some provision such as a small notch at the top of the wall to ensure adequate gas evacuation and allow gas back-fill during the panel fabrication and gas-processing manufacturing steps. Further, barrier-rib structures (not shown) may only need to cover a portion of the gas gap, and may be partially conductive. In another embodiment, instead of the spacer-barrier wall 74 shown in FIG. 3, a "virtual" barrier may be formed by a relatively deep surface depression at the same location where the spacer-barrier would have been. In this embodiment, the "virtual" barrier is used because the gas gap with the depression would be too great for the voltage to support a discharge in or across the depression.

A gas gap 84 is the "empty space", or void, between input substrate 70 and output substrate 72 and is filled with an appropriate gas mixture at an appropriate pressure per as previously discussed. Standard known methods used to seal PDPs are used to seal substrates 70 and 72, thus forming a chamber to contain the gas. The gas may be a Penning type mixture. Spacers 74 are configured to allow proper gas distribution, pressurization and gas gap for appropriate electric field across the gas.

PP-based detector 100 further includes an output substrate 72 which is on the side of the plasma panel where the sensing mechanisms transition through the avalanche phase into the formation of an "image". In an embodiment where the imaging function is "driven" by camera shots of the avalanches, output substrate 72 is at least partially "transparent" and therefore constructed with glass and with electrodes sufficiently transparent or narrow to reveal the avalanches.

PP-based detector 100 further includes three types of electrodes: Yc or column electrodes 76, Yr or row electrodes 80, and an emitter source X-electrode(s) 26. The column and row electrodes provide directional current paths from the discharge. Emitter source electrode 26 (i.e., the input substrate electrode), may be patterned into a set of electrodes, or it may be a continuous conductive plane or surface (e.g. metal film) as in FIG. 3, with one connection to a "drive" circuit. The drive circuit as shown schematically in FIG. 1, can be as simple as a DC power supply 10, connected through a resistor 8. It is also possible that the emitter source layer is contacted to, or integrated with, metallic or non-metallic transparent conductive electrode patterns.

In an embodiment where the Yc- and Yr-electrodes 76 and 80 are used on a single substrate as shown in FIG. 3, they are connected to separate "drive" circuits, which may be a DC power supply connection through one resistor. In the embodiment of FIG. 3, Yc- and Yr-electrodes 76 and 80 are "paired" together in close proximity to form Yc/Yr individual pixels with the same voltage potential on each electrode so that a discharge caused by an avalanche from the input substrate's X-electrode to either the Yc- or Yr-electrode spreads from one to the adjacent-other locally. Current will flow in both electrodes into the drive circuits, which may also serve as current (or voltage drop across impedance) sensors. Therefore, the Yc-Yr column-row (directional-current) "location" of the initial discharge can be determined if each electrode has its own drive sensor circuit. Yc- and/or Yr-electrodes 76 and 80 may include emitter source materials, whether on the input or the output substrate. As will be described further below, the dielectric insulation layer 78 that is applied to the output substrate to separate column and row electrodes, may be made slightly conductive to prevent charge buildup on the inner walls while maintaining a strong current directionality for DEYc-r sensing.

In addition to the above embodiments, the structure shown in FIG. 3 can be "flipped" so that the bottom substrate is on top serving as the input substrate and the top substrate is on the bottom serving as the output substrate. In such an embodiment, the Yc- and Yr-electrodes become emitter sources as well as current flow directors. The other substrate could also have emitter source material in its electrode structure. One substrate's electrodes may be grounded (e.g., Yc and Yr). The other electrode is connected through a resistor to the DC power supply. The resistor limits the current flow during an avalanche and effectively controls the avalanche parameters: how long it lasts, how much it spreads, and when it can reoccur. Each avalanche parameter is a function of the resistor together with other design parameters such as the gas, and the electrode material and geometry. Electrodes, including emitter source 26, in one embodiment can be patterned into groups that are electrically isolated and driven by separate resistors to achieve the avalanche characteristics desired. For example, in one embodiment, each individual electrode shown in FIG. 3 needs to have a resistor for properly controlled avalanches and to provide current sensing circuitry such as that shown in FIGS. 1 and 2. If the output substrate is transparent, or mostly transparent including electrode, each discharge location could be determined with a solid state, sensor-based camera (e.g., CMOS or CCD)

An alternative embodiment to sensing current by the voltage-drop across a resistor or other impedance device is to use current-sensing, opto-isolators in series with resistors. The opto-isolators provide direct outputs (i.e., DEYc or DEYr) to the electronic circuitry and are a standard method for reducing large amplitude voltages that can be problematic. In another embodiment, photodiodes are used in series with resistors. The photodiodes could be arranged around a plasma panel such that a digital camera 40 (FIG. 2) could be used to capture DEYc or DEYr occurrences.

Spacers 74 of FIG. 3 interfacing the gas may attract and store charge that inhibits PP-device sensitivity and response to incident ionizing-photon radiation. Spacers and barriers may be implemented as partially conductive structures that need to have a bias voltage applied. In FIG. 3, for example, in one embodiment each spacer 74 may require a bias voltage connection. A bias voltage may be applied on a timing basis and synchronized to be applied just after an avalanche is detected to remove charge along the barrier. An embodiment may include an individual control for each barrier.

Embodiments of the invention include a PP-seal that maintains a long-term, gas-tight, hermetic barrier under pressure and mechanical stresses. The seal also includes a gas-exchange port mechanism. The seal is consistent with maintaining the gas gap with or without the spacer-barriers in the plasma panel. In one embodiment the seal material is conductive, and one of the substrates is an insulator with a very slightly but continuously conductive ring or band coating between the conductive seal and the conductive active-area electrodes on the non-conductive substrate. This should keep the field gradients lower at or near the seal as compared to the active area, and completely eliminate dielectric surfaces on the inside of the detector seal that could store charge and mask or mimic gamma-ray events.

In one embodiment, previously discussed structures may be converted to AC operation by application of a dielectric coating over the electrode surfaces, insulating them from the gas. For example, Yc- and Yr-electrodes 76, 80 of FIG. 3 could be insulated from the gas by a dielectric overcoat and operated as a surface-discharge AC plasma panel. In this embodiment, an emitter layer would continue to be needed, but not as an input electrode, and may or may not have a dielectric overcoat.

Any known or future developed manufacturing processes used to fabricate PDPs can be used with embodiments of the present invention. In one embodiment, in order to maximize the transmission of low energy keV ionizing-photon radiation through the input substrate and minimize mechanical strain, the input and output substrates are of identical material composition and thickness, and fabricated from the thinnest glass suitable for commercial PDP processing. One such example for the glass substrate would be to use standard, 2.8 mm thick, Asahi PD200. As lower cost, compatible, thinner (or thicker) glass substrate materials become available, they may be substituted for 2.8 mm Asahi PD200.

Embodiments of the present invention, as shown in FIG. 3, have essentially all of the most complex processing steps relegated to the output plate. Since there are no material-specific or process-specific requirements for the Y-electrodes, they could be fashioned from a variety of low cost, conductive materials, and fabricated by any one of a number of conventional thick-film and/or thin-film processes. In one embodiment the bottom Yr-electrodes are made as thin as reasonably possible in order to have minimum impact on the surface planarity of the subsequent dielectric layer 78. In one embodiment, PDP thin-film electrode material system Cr/Cu/Cr is sputtered and lithographically patterned, although other thin-film electrode material systems can also be used. Once the bottom Yr-electrodes have been fabricated, a "PDP type" thick-film, dielectric paste is applied and then fired to form a suitable insulating layer between the bottom Yr-electrodes and top Yc-electrodes. Next, a standard dielectric acid etching process, such as a dilute nitric acid spray, is used in conjunction with a suitably patterned photoresist layer, to create the necessary vias through the dielectric to the bottom Yr-electrodes. After via completion, a standard thin-film or thick-film conductive coating (e.g., Cr/Cu/Cr film, nickel paste, etc.) is applied to coat or fill the vertical vias and create a conductive bridge or vertical-column to electrically bring the bottom Yr-electrodes up to the top surface of the dielectric layer. At the same time, or subsequently, the surface Yc- and Yr-electrodes are fabricated using standard thin-film or thick-film electrode materials/processes. The more intricate surface Yr-electrode pattern, as shown in FIG. 3, is in electrical contact with, and properly aligned with respect to, and centered over, the previously fabricated conductive vias.

In one embodiment, discharge-isolation barrier ribs in place of some or all of the spacer-barriers 74 are fabricated using manufacturing processes currently employed in the barrier fabrication process for commercial PDPs. However, since a number of applications for the invention do not have a high-resolution requirement (in contrast to PDPs for HDTV), relatively low-resolution panels can be fabricated. Therefore, instead of fabricating the discharge-isolation barrier ribs by a negative process (i.e., material removal) such as sandblasting, lift-off, or etching, a lower cost, positive fabrication process such as screen-printing can be used. If only intermittent spacers are required, then even lower cost production processes can be employed, such as using preform spacer materials in conjunction with a pick-and-place fabrication process.

As described, embodiments of the present invention utilize a plasma panel structure in conjunction with detection electronics to form a PP-based detection device that can be manufactured inexpensively. Several embodiments of the present invention are specifically illustrated and/or described herein. However, it will be appreciated that other modifications and variations of the present invention are covered by the above teachings and within the purview of the appended claims without departing from the spirit and intended scope of the invention.

What is claimed is:
1. An ionizing radiation counting detector comprising:
a first substrate;
a second substrate generally parallel to said first substrate and forming a gap with said first substrate;
a gas contained within said gap;
at least one first electrode coupled to said first substrate;
at least one second electrode coupled to said second substrate;
at least one third electrode coupled to said second substrate;
a second impedance coupled to said second electrode;
a third impedance coupled to said third electrode;
a power supply coupled to said first electrode;
a first discharge event detector coupled to said second impedance;
a second discharge event detector coupled to said third impedance; and
a plurality of pixels defined by said second electrode and said third electrode, each pixel capable of outputting a gas discharge pulse upon interaction with ionizing radiation wherein each gas discharge pulse has approximately an equal value;
wherein said first and second discharge event detectors comprise detection circuitry for detecting if a gas discharge pulse is output from the pixels and for counting each gas discharge pulse as an individual discharge event, said detection circuitry comprising timestamp circuitry coupled to said first discharge event detector and said second discharge event detector that timestamps discharge events detected by said first discharge event detector and said second discharge event detector and combines discharge events having the same timestamp;

wherein an amount of detected radiation is based on the number of counted discharge events.

2. The ionizing radiation counting detector of claim 1, wherein said second electrode and said third electrode are paired in close proximity to define said pixels.

3. The ionizing radiation counting detector of claim 2, wherein said first electrode is an X-electrode, said second electrode is a Yc (column)-electrode, and said third electrode is a Yr (row)-electrode.

4. The ionizing radiation counting detector of claim 3, further comprising an ionizing-photon to free-electron emitter layer coupled to said first substrate and defining said X-electrode as an emitter source electrode.

5. The ionizing radiation counting detector of claim 1, further comprising:
at least one first driver coupled to said second electrode; and
at least one second driver coupled to said third electrode.

6. The ionizing radiation counting detector of claim 1, further comprising:
discharge event data storage coupled to said time-stamp circuitry for storing combined discharge events detected by said first discharge event detector and said second discharge event detector that have the same timestamp.

7. The ionizing radiation counting detector of claim 6, further comprising:
sensitivity control coupled to said discharge event data storage for providing feedback information to said power supply and said first and second discharge event detectors.

8. The ionizing radiation counting detector of claim 1, further comprising:
a hermetic seal coupling said first substrate to said second substrate; and
peripheral edge spacers to define said gap.

9. The ionizing radiation counting detector of claim 1, further comprising a dielectric layer between said second electrode and said third electrode.

10. The ionizing radiation counting detector of claim 1, further comprising a first impedance coupled to said first electrode.

11. An ionizing radiation counting detector comprising:
a first substrate;
a second substrate generally parallel to said first substrate and forming a gap with the first substrate;
a gas filling said gap;
an emitter source electrode coupled to said first substrate;
a current directional first and second electrode coupled to said second substrate and defining a pixel centroid;
a first driver, a first current limit impedance and a first pulse detector coupled to said first electrode;
a second driver, a second current limit impedance and a second pulse detector coupled to said second electrode; and
a plurality of pixels defined by said first electrode and said second electrode, each pixel capable of outputting a gas discharge pulse upon interaction with ionizing radiation wherein each gas discharge pulse has approximately an equal value;
wherein said first and second pulse detectors comprise detection circuitry for detecting if a gas discharge pulse is output from the pixels and for counting each gas discharge pulse as an individual discharge event, said detection circuitry comprising timestamp circuitry coupled to said first pulse detector and second pulse detector that timestamps discharge events detected by said first pulse detector and said second pulse detector and combines discharge events having the same timestamp;

wherein an amount of detected radiation is based on the number of counted discharge events.

12. The ionizing radiation counting detector of claim 11, further comprising:
a power supply, an third driver and a third current limit impedance coupled to said emitter source electrode.

13. The ionizing radiation counting detector of claim 12, wherein said emitter source electrode is an X-electrode, said first electrode is a Yc (column)-electrode, and said second electrode is a Yr (row)-electrode .

14. The ionizing radiation counting detector of claim 11, further comprising:
discharge event data storage coupled to said time-stamp circuitry for storing combined discharge events detected by said first pulse detector and said second pulse detector that have the same timestamp.

15. The ionizing radiation counting detector of claim 14, further comprising:
sensitivity control coupled to said discharge event data storage for providing feedback information to said power supply and said first and second pulse detectors.

16. The ionizing radiation counting detector of claim 11, further comprising:
a hermetic seal coupling said first substrate to said second substrate; and
peripheral edge spacers that define said gap.

17. The ionizing radiation counting detector of claim 11, further comprising a dielectric layer between said second electrode and said first electrode.

18. A method of detecting ionizing radiation based on counting of gas discharge events comprising:
receiving ionizing radiation at a first substrate of a plasma panel, said plasma panel having a second substrate;
creating at least one free-electron within said first substrate in response to the received ionizing-photon radiation, said creating resulting in an emittance of an electron out of said first substrate and into a gas contained within a gap between said first and second substrates;
causing a gas discharge pulse at a pixel site of the plasma panel, said pixel site capable of outputting said gas discharge pulse upon interaction with ionizing radiation wherein each gas discharge pulse has approximately an equal value; and
counting said pulse at a first pulse detector coupled to a second electrode and at a second pulse detector coupled to a third electrode, wherein said second and third electrodes are coupled to said second substrate of the plasma panel, and wherein said counting comprises detecting if said gas discharge pulse is output from the pixel site and for counting each gas discharge pulse as an individual discharge event;
timestamping discharge events and combining discharge events having the same timestamp;
wherein an amount of detected radiation is based on the number of counted discharge events.

19. An ionizing radiation counting detector comprising:
a first substrate;
a second substrate generally parallel to said first substrate and forming a gap with said first substrate;
a gas contained within said gap;
at least one first electrode coupled to said first substrate;
at least one second electrode coupled to said second substrate;

at least one third electrode coupled to said second substrate;

a second impedance coupled to said second electrode;

a third impedance coupled to said third electrode;

a power supply coupled to said second electrode;

a first discharge event detector coupled to said second impedance;

a second discharge event detector coupled to said third impedance; and a plurality of pixels defined by said second electrode and said third electrode, each pixel capable of outputting a gas discharge pulse upon interaction with ionizing radiation wherein each gas discharge pulse has approximately an equal value;

wherein said first and second discharge event detectors comprise detection circuitry for detecting if a gas discharge pulse is output from the pixels and for counting each gas discharge pulse as an individual discharge event, said detection circuitry comprising timestamp circuitry coupled to said first discharge event detector and said second discharge event detector that timestamps discharge events detected by said first discharge event detector and said second discharge event detector and combines discharge events having the same timestamp;

wherein an amount of detected radiation is based on the number of counted discharge events.

20. The ionizing radiation counting detector of claim 19, further comprising:

at least one driver coupled to said third electrode.

* * * * *